(12) United States Patent
Akhtar et al.

(10) Patent No.: US 8,221,574 B2
(45) Date of Patent: Jul. 17, 2012

(54) TOP COATING FOR INDOOR AND OUTDOOR TEMPORARY REMOVABLE GRAPHICS AND SYSTEM AND METHOD FOR MAKING, APPLYING AND REMOVING SUCH GRAPHICS

(75) Inventors: Parvez Akhtar, Roswell, GA (US); John Fitzwater, Atlanta, GA (US); Norman J. Greenberg, Marietta, GA (US)

(73) Assignee: CSD, LLC, Eatonton, GA (US)

( * ) Notice: Subject to any disclaimer, the term of this patent is extended or adjusted under 35 U.S.C. 154(b) by 757 days.

(21) Appl. No.: 11/833,045

(22) Filed: Aug. 2, 2007

(65) Prior Publication Data

US 2008/0264559 A1    Oct. 30, 2008

Related U.S. Application Data

(60) Provisional application No. 60/914,123, filed on Apr. 26, 2007, provisional application No. 60/914,133, filed on Apr. 26, 2007.

(51) Int. Cl.
| | |
|---|---|
| *B29C 65/00* | (2006.01) |
| *B32B 37/00* | (2006.01) |
| *B32B 38/10* | (2006.01) |
| *B32B 38/14* | (2006.01) |
| *C04B 24/38* | (2006.01) |
| *C08G 63/48* | (2006.01) |
| *C08G 63/91* | (2006.01) |
| *C08F 290/14* | (2006.01) |

(52) U.S. Cl. ........ 156/247; 156/277; 525/50; 525/54.23
(58) Field of Classification Search ................... 156/247, 156/277; 525/54.23, 50
See application file for complete search history.

(56) References Cited

U.S. PATENT DOCUMENTS

| | | | |
|---|---|---|---|
| 3,802,952 A | 4/1974 | Gurin et al. | |
| 3,855,170 A | 12/1974 | Junkin et al. | |
| 3,932,191 A | 1/1976 | Jerabek et al. | |
| 4,179,304 A * | 12/1979 | Rossomando | ............. 106/162.7 |
| 4,680,237 A | 7/1987 | Kenney et al. | |
| 4,927,556 A | 5/1990 | Pokorny | |
| 5,041,488 A | 8/1991 | Meades | |
| 5,093,396 A | 3/1992 | Calhoun et al. | |
| 5,100,735 A | 3/1992 | Chang | |
| 5,104,719 A | 4/1992 | Kamen et al. | |
| 5,191,014 A | 3/1993 | Roberts et al. | |
| 5,229,201 A | 7/1993 | Blanco | |
| 5,320,693 A | 6/1994 | Helf | |
| 5,328,535 A | 7/1994 | Blanco | |
| 5,397,634 A | 3/1995 | Cahill et al. | |
| 5,407,666 A | 4/1995 | Patel et al. | |
| 5,509,969 A | 4/1996 | Grawe | |

(Continued)

OTHER PUBLICATIONS

"Product Data Sheet for CAB 553-0.4", Eastman Chemical Company, Aug. 2006.*

(Continued)

*Primary Examiner* — Michael Orlando
(74) *Attorney, Agent, or Firm* — Kenyon & Kenyon LLP

(57) ABSTRACT

A composition for a removable top coating for protecting the exposed face of a temporary removable graphic is provided. A remover for the transferred graphic image is provided that completely dissolves the temporary removable graphic, but does not affect the commonly encountered substrates such as concrete, brick, wooden floors, asphalt surfaces, terrazzo and motor vehicle body surfaces, marine and aeronautical craft surfaces. A method for making, applying and removing the temporary removable graphic is provided.

18 Claims, 1 Drawing Sheet

U.S. PATENT DOCUMENTS

| | | | |
|---|---|---|---|
| 5,681,660 | A | 10/1997 | Bull et al. |
| 5,720,804 | A | 2/1998 | Martin |
| 5,741,368 | A | 4/1998 | Sahbari |
| 5,773,077 | A | 6/1998 | Edmond |
| 5,785,958 | A * | 7/1998 | Sirdesai et al. ............ 424/61 |
| 5,789,067 | A | 8/1998 | Mizumachi et al. |
| 5,851,614 | A | 12/1998 | Buck |
| 5,904,976 | A | 5/1999 | Berry et al. |
| 5,916,861 | A | 6/1999 | Lyssy |
| 5,972,095 | A | 10/1999 | Graves et al. |
| 5,985,951 | A | 11/1999 | Cook |
| 6,054,208 | A | 4/2000 | Rega et al. |
| 6,090,238 | A | 7/2000 | Smith |
| 6,117,829 | A | 9/2000 | Diaz et al. |
| 6,139,822 | A | 10/2000 | Socci et al. |
| 6,180,228 | B1 | 1/2001 | Mueller et al. |
| 6,187,849 | B1 | 2/2001 | Nugent, Jr. et al. |
| 6,254,878 | B1 | 7/2001 | Bednarek et al. |
| 6,254,970 | B1 | 7/2001 | Hiatt et al. |
| 6,355,322 | B1 | 3/2002 | Gollege |
| 6,428,814 | B1 | 8/2002 | Bosch et al. |
| 6,455,140 | B1 | 9/2002 | Whitney et al. |
| 6,479,142 | B1 | 11/2002 | Condon et al. |
| 6,511,547 | B1 | 1/2003 | Sahbari |
| 6,589,636 | B2 | 7/2003 | Emslander et al. |
| 6,613,412 | B2 | 9/2003 | Dressler |
| 6,689,441 | B1 | 2/2004 | Kim |
| 6,783,829 | B2 | 8/2004 | Arena |
| 6,793,859 | B2 | 9/2004 | Emslander et al. |
| 6,830,803 | B2 | 12/2004 | Vaidya et al. |
| 6,857,737 | B2 | 2/2005 | Emslander et al. |
| 6,875,497 | B2 | 4/2005 | Emery et al. |
| 6,942,911 | B2 | 9/2005 | Nakayama |
| 6,984,427 | B2 | 1/2006 | Galkiewicz et al. |
| 7,291,233 | B2 | 11/2007 | Brigato |
| 7,296,826 | B2 | 11/2007 | Hagen |
| 7,402,223 | B2 | 7/2008 | Marks, III et al. |
| 2001/0039316 | A1 | 11/2001 | Campbell et al. |
| 2002/0139392 | A1 | 10/2002 | Cervero et al. |
| 2004/0025907 | A1 | 2/2004 | Tadych |
| 2004/0043221 | A1 | 3/2004 | Bharti et al. |
| 2004/0091682 | A1 | 5/2004 | Brinkmann |
| 2004/0175407 | A1 | 9/2004 | McDaniel |
| 2004/0200568 | A1 | 10/2004 | Rhein et al. |
| 2005/0019359 | A1 | 1/2005 | Amato et al. |
| 2005/0026799 | A1 | 2/2005 | Detar et al. |
| 2006/0003114 | A1 | 1/2006 | Enlow et al. |
| 2006/0019068 | A1 | 1/2006 | Hannington |
| 2006/0020079 | A1 | 1/2006 | Lorenzo et al. |
| 2006/0089281 | A1 | 4/2006 | Gibson |
| 2006/0222831 | A1 | 10/2006 | Sloan |
| 2006/0251688 | A1 | 11/2006 | Gajanan et al. |
| 2007/0054998 | A1 | 3/2007 | Harashina |
| 2007/0095002 | A1 | 5/2007 | Kim-Whitty |
| 2007/0095003 | A1 | 5/2007 | Hei et al. |
| 2007/0107636 | A1 | 5/2007 | Warren |
| 2007/0110966 | A1 | 5/2007 | Warren |
| 2007/0218238 | A1 | 9/2007 | Greer |
| 2007/0231281 | A1 | 10/2007 | Socci |
| 2007/0258940 | A1 | 11/2007 | Hamilton et al. |
| 2008/0003406 | A1 | 1/2008 | Steelman |
| 2008/0135163 | A1 | 6/2008 | Farmer |
| 2008/0206583 | A1 | 8/2008 | Phan et al. |
| 2008/0264599 | A1 | 10/2008 | Blejde et al. |

OTHER PUBLICATIONS

"Cellulose Esters", Eastman Chemical Company, Sep. 1994 http://www.eastman.com/Literature_Center/E/E138.pdf.*

International Search Report of PCT/US08/073288.

U.S. Appl. No. 11/842,291, Akhtar et al., filed Aug. 21, 2007.

U.S. Appl. No. 13/330,055, Akhtar et al., filed Dec. 19, 2011.

* cited by examiner

TOP COATING FOR INDOOR AND OUTDOOR TEMPORARY REMOVABLE GRAPHICS AND SYSTEM AND METHOD FOR MAKING, APPLYING AND REMOVING SUCH GRAPHICS

CROSS-REFERENCE TO RELATED APPLICATION

This application claims priority to copending U.S. Provisional Application No. 60/914,123, entitled "A Water Based Back Coat For Temporary Graphics Fabrication," filed Apr. 26, 2007, and U.S. Provisional Application No. 60/914,133, entitled "A Solvent Based Top Coating For Temporary Graphics Fabrication," filed Apr. 26, 2007, both of which are herein incorporated by reference in their entirety.

FIELD OF THE INVENTION

The invention is a top coating composition for indoor and outdoor temporary removable graphics and a method for making, applying and removing temporary removable graphics.

BACKGROUND OF THE INVENTION

Numerous types of stickers and graphics are available in the market today that are of the self-adhesive type or may be applied after coating with an adhesive. There are also numerous adhesives available for securing an image that is pre-applied onto a special water release paper, and then transferred to a painted or unpainted surface. However, removal of the sticker material along with the image is a cumbersome process and usually results in damage to the underlying surface.

There is a need in the market place for a strong composite structure that can be used as a temporary removable graphic, which can be easily applied, and when desired, can be easily removed without damage to the underlying substrate. Potential uses for such a temporary removable graphic are as an advertisement, logo, label, banner, sign, instructions, color coding, identification and many other functional situations that identify, protect or decorate substrates. A composite structure is needed that can be applied to concrete, brick, asphalt, tar, parking lots, terrazzo, parquet, wood, glass, metals, plastics, ceramics, elastomers, rubber, fabrics, textiles and other painted or unpainted substrates.

There is also a complete absence in the market for a suitable system and method that may be used as an indoor or outdoor temporary removable floor graphic. This is difficult to accomplish today, because items such as graphics or signs are not durable enough and cannot be used on walking and driving surfaces as they do not have the necessary strength and resistance properties to fulfill the service life required. Also, they cannot be easily removed from substrates without damage to the underlying surface.

Graphics or signs are applied to substrates by standard techniques such as screen printing, gravure printing, flexographic printing or hand-painting, to form finished products. The graphics cannot be easily removed from the substrates, especially painted or coated substrates without damage to the underlying surfaces. Aggressive solvents such as toluene, xylene, methylethyl ketone, ethyl acetate, acetone, trichloroethylene, hexane and other hydrocarbon mixtures of solvents would usually be required to remove the adhesive and printing ink, and would result in damage to painted substrates and many other substrates such as plastics.

Graphics and signs can also be applied to substrates using a paper, film and an adhesive. The film or coated paper has graphics printed on the surface or on the reverse side of the film or coated paper. Also, on the reverse side of the surface an adhesive is applied in the form of a pressure sensitive adhesive or a remoistenable adhesive followed by some type of release paper in certain situations. The graphic or sign is applied by peeling away the release paper and applying to various substrates. An example of this would be a label stuck on a wooden object or a label put on an automobile body. In both cases, the label cannot be easily removed from the substrate without possible surface damage.

There is a need for a composite structure that can be applied to an outdoor surface such as a floor, a wall, a painted vehicle body, a marine or aeronautical craft body, to serve as an advertisement or sign for an extended period of time. Wind, rain, sunlight or other environmental factors should not adversely affect the performance of the composite structure. At a designated time, the advertisement or sign can be easily removed without damage to the underlying substrates. After removal and clean up, a new advertisement or sign can be repeatedly re-applied to the same surface.

A practical application would be to apply an advertisement to outdoor vertical and horizontal surfaces by applying graphics on concrete, asphalt, brick or cement block and to an indoor floor such as a painted or unpainted concrete or terrazzo floor in a shopping mall or store. The advertisement or sign should have a composite structure that would be easy to apply, easy to remove but would have sufficient properties to be used on an outdoor or indoor walking and driving surface such as a parking lot or a floor in a shopping mall.

Another practical application would be to apply an advertisement, sign or graphic to the body of an auto vehicle, marine or aeronautical craft, that would have sufficient properties to last for an extended period of time outdoors including repeated automatic or manual washing using a detergent or windshield washing with an ammonia solution. When desired, the advertisement, sign or graphic could be easily removed without damage to the surface. If required, a fresh temporary removable graphic could be re-applied onto the same surface.

Traditionally, the transfers of images are of two types: those which have a dry release; and those which have a wet release. The wet release graphics have an image printed on a paper which is pre-coated with a layer of water soluble gum. The back side of the printed image is usually coated with a water remoistenable glue. When the graphic is soaked with water and pressed on a surface on which the image is to appear, the soluble gum layer partially dissolves and becomes soft, so that the paper may be removed, leaving the image on the desired surface. The paper on which the image is printed is known as a wet release paper. This is normally made up of an absorbent paper of good quality which is coated with some type of water soluble starch or vegetable gum to act as a release layer. The paper or backing serves as a support for the release layer and subsequent layers of ink and adhesive.

The image may be applied on the paper with standard methods, such as printing, copying or drawing directly or in reverse, depending on the final surface. A wide variety of inks are used, and the image can be applied by standard methods such as silk screening, offset printing, digital printing or toner based laser printout.

Normally, the process begins by application of a coat of lacquer or varnish on the gum coated side of the paper surface. Then the image is printed on the lacquer, and a water remoistenable glue is coated on to the dried surface of the ink. To apply the graphics, it is submerged in water for a short while, causing the water soluble gum layer to release the paper from the image. The image and adhesive composite structure is slid off from the paper, and transferred to the substrate for its intended long-term use.

The graphics need to be protected on the outer face by a polymeric top coating as a key part of the composite structure. The polymeric coating must be flexible, clear, durable, have good resistance properties to ultraviolet light, water, humidity, rain, snow, heat, cold, pollution, common cleaning chemicals and soaps. The polymeric coating must be able to be applied from solution or in a molten state by various application methods to yield consistent, quality films. Inks, decorative and functional coatings must be able to be applied to the dried polymeric film. Back coatings must be able to be applied to the composite polymeric coating and ink structure. The polymeric coating must have the unique ability to have the necessary service life properties and be able to be removed easily with a remover without leaving any residue or damaging the substrate.

SUMMARY OF THE INVENTION

A polymeric coating was developed by dissolving various combinations of polymers, such as cellulose acetate butyrate ester, sucrose acetate isobutyrate, acrylic and methacrylic polymers in solvents such as the lower alcohols, esters, glycol ethers, and glycol ether acetates.

The preferred results were obtained by using from 50 to 70% by dry weight of cellulose acetate butyrate ester (CAB), 20 to 50% of an acrylic polymer and 2 to 10% of sucrose acetate isobutyrate as a plasticizer. Preferably a mixture of acrylic polymers such as copolymers of methyl methacrylate and n-butyl methacrylate is used. An alkoxylated modified siloxane flow improver can be used with this composition. The polymers are selected on the basis of their solubility molecular weight (MW) glass transition temperature Tg and acid value.

The preferred solvent consists of approximately 20 to 30% of ethyl alcohol, 10 to 12% of isopropyl alcohol, 10 to 20% of diacetone alcohol, 2 to 5% of ethylene glycol n-butyl ether and 10 to 20% of propylene glycol monomethyl ether acetate and 2 to 5% of tetrahydrofurfuryl alcohol based upon the weight of the solvent and the polymers.

Selected polymers must be soluble in very polar solvents such as alcohols and must have a molecular weight range of 10,000 to 500,000 in order to have the necessary balance of film toughness and viscosity control. Blends of various polymer systems are often necessary to achieve the best balance of properties such as hardness, abrasion resistance and flexibility. The coatings are based mainly on a combination of acrylic, methacrylic and cellulose acetate butyrate polymers. The polymeric coating can also be pigmented or tinted using compatible dispersions made from pigment chips or dye solutions. Other additives may be added to achieve specific physical effects and properties. Such additives could be UV absorbers, optical brightening agents, UV tracers, heat stabilizers, plasticizers, phosphorescence agents and anti-oxidants.

The polymeric solution formed is coated onto a "water release slide paper." The coating is applied by standard methods such as roller coating, knife coating, blade coating, rod coating, screen coating, spraying or other suitable methods to form a smooth wet film of 4 to 7 mils in thickness. The coating is cured or dried at temperatures from 60° F. to 300° F. Drying can be done in atmospheric conditions or by using standard techniques like convection hot air ovens or conveyor tunnels.

The resulting polymeric film of the top coating is now ready to have additional layers applied to it, such as inks and finally an adhesive back coating.

The top coating does not need to have a graphic layer and can be used as a protective layer for a substrate.

The back coat is applied onto the printed image graphic as a "peel-and-stick" pressure sensitive adhesive film. The resulting graphic is a composite structure having a polymeric film formed by the top coating as the top face and the pressure sensitive adhesive back coat as the back face. The release paper from the back face of the adhesive film is now removed and the composite structure is adhered to the target substrate. At this stage, the top face of the temporary removable graphic still has the water release paper adhering to the top coat. It can be activated and detached from the top face of the temporary removable graphic by applying water or soaking the water release coated paper in water, and after the release coating of the gum on the paper is dissolved, gently sliding off the paper. This completes the installation process.

The adhesive back coat is used in the form of a high tack, peel-and-stick film supplied as a proprietary product by Avery Dennison Graphics and Reflective Products Division. It is prepared separately by coating a high tack acrylic based emulsion adhesive on to a siliconized release paper, drying the coating and applying a second layer of release paper onto the adhesive film. This forms a laminated sandwich structure with the two release papers on each face, and the tacky adhesive film in the middle.

The composite structure was activated by immersing in water and the release film was removed. The composite structure was then applied to a painted surface. The composite structure demonstrated the surface life required After the desired service duration, the composite structure can be easily removed from the substrate by using a novel remover described in this invention, without causing damage to the substrate. The preferred remover has a formulation of:

from 50 to 80% of tetrahydrofurfuryl alcohol;

from 5 to 20% of dibasic ester;

4 to 12% of ethylene glycol n-butyl ether;

4 to 12% of the ethyl 3-ethoxypropionate; and 4 to 12% of the 2,2,4-trimethyl-1,3 pentanoldiol monoisobutyrate.

The cleaning up of the dissolved composite structure and the remover is done by applying a high surface area absorbent/adsorbent based on such materials as vermiculite, aluminum silicate, Fuller's earth, ground cellulosic materials such as waste paper or cornmeal or similar materials to absorb/adsorb the excess remover and the dissolved temporary composite structure without damage to the substrate or to the environment.

When it is desired to remove the temporary removable graphic, the remover solution is spread on the surface of the graphic and scrubbed. A powder may be used to absorb the residue and then removed.

Figure 1:
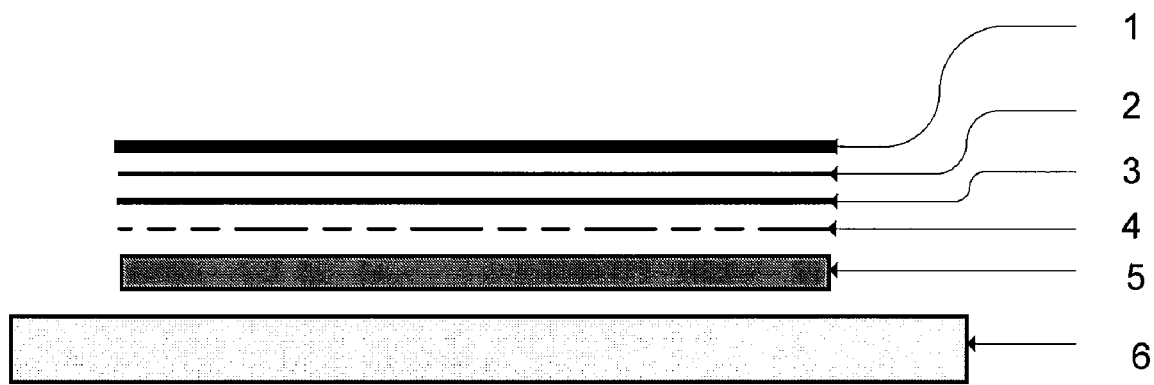
FIG. 1 is a cross-section view of the temporary removable graphic, shown as a composite structure before it is applied to a surface.
Figure 2:
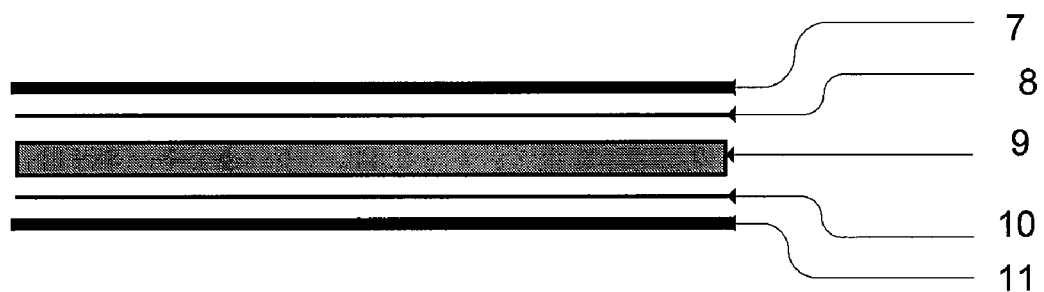
FIG. 2 is a cross-section view of the "peel-and-stick" adhesive film, shown as a composite structure before it is applied to the printed graphic back surface.

Key for FIGS. 1 and 2:

| | |
|---|---|
| 1 | Water slide paper |
| 2 | Release coating |
| 3 | Top Coating |
| 4 | Printed Image/Graphic |
| 5 | Pressure Sensitive Adhesive Film |
| 6 | Substrate (floor, brick or other) |
| 7 | Release Paper |
| 8 | Silicone Release Layer |
| 9 | Pressure Sensitive Adhesive Film |
| 10 | Silicone Release Layer |
| 11 | Release Paper |

DETAILED DESCRIPTION OF THE PREFERRED EMBODIMENT

A polymeric coating is provided that is used in a composite graphic structure. The composite structure is formed by the polymeric coating, an ink and an adhesive back coating. The composite structure can be used as a temporary removable graphic or advertisement on a wide variety of surfaces. In addition, a remover is provided that easily removes the composite structure from various surfaces without damage to the substrate.

The polymeric coating is made from a combination of polymers, namely, a cellulose acetate butyrate ester and acrylic polymer. Cellulose acetate butyrate ester (CAB) is preferably one that is soluble in low molecular weight alcohols, such as methyl alcohol, ethyl alcohol, isopropyl and N-propyl alcohol and some other common organic solvents. Preferably the CAB has a high hydroxyl content, such as 3 to 6% by weight which aids in its alcohol solubility. The preferred CAB is CAB 553-0.4 produced by Eastman Chemical Company. CAB-553-0.4 has a high hydroxyl content of approximately 4.8% by weight. It is important that the CAB have a high hydroxyl content so that it is soluble in the lower molecular weight alcohols. CAB 531.1 can also be used but it is not as good as the CAB 553-0.4 because of its lower solubility in alcohol. It has approximately 1.7% by weight of hydroxyl content.

The CAB is mixed with one or more acrylic polymers. One of the preferred acrylic polymers is methyl methacrylate copolymer. NeoCryl B-734 is a preferred acrylic polymer. This acrylic polymer is manufactured by DSM NeoResins, Inc. This acrylic polymer is soluble in some of the lower molecular weight alcohols. This particular polymer has an advantage in that it is resistant to gasoline, oil and grease which may be important in some applications. NeoCryl B-734 has an average molecular weight of 105,000, a Tg of 45° C. and an acid value of zero.

The acrylate can be a copolymer of methyl methacrylate and n-butyl methacrylate. An example of such a copolymer is NeoCryl B-723 which has a molecular weight (MW) of about 200,000, a Tg of 48° C. and an acid value of 5.5. The NeoCryl B-734 is preferred because of its higher solubility and other characteristics. The NeoCryl B-734 has an excellent compatibility with CAB because it has an amino functional monomer built into the backbone of the compound which allows for superior cohesion properties when inks are applied to it.

Another acrylic polymer that can be used is a copolymer of n-butyl methacrylate and methyl methacrylate sold under the name BR-106 by Dianal America, Inc. It has a molecular weight of approximately 60,000, a Tg of 58° C. and an acid value of 3.0. A mixture of BR-106 and B-734 is preferred.

It is preferred to add sucrose acetate isobutyrate to the mixture of polymers. The preferred sucrose acetate isobutyrate is SAIB 100 manufactured by Eastman Chemical, Inc. It serves as a modifying extender for the polymer films. The SAIB 100 has a molecular weight of from 832 to 856. It is also soluble in the lower molecular weight alcohols. The SAIB 100 has a plasticizing effect and improves leveling and clarity of the film.

A flow modifier is preferably used to reduce or eliminate film defects such as craters, crawling and fisheyes. These help provide a uniform film on a substrate. A preferred flow improver is FX8 manufactured by Eagle Specialty Products. It is a combination of alkoxylated polydimethylsiloxane and ethyleneglycol n-butyl ether. The ethyleneglycol n-butyl ether is present in approximately 53% by weight and the alkoxylated polydimethysiloxane is present in an amount of approximately 47% by weight. Other flow modifiers may be used to improve the flow and leveling of the polymeric films.

The above polymer compositions may be dissolved in a lower molecular weight alcohol for application to a substrate. Ethyl alcohol, isopropyl alcohol and diacetone alcohol may be used as solvents for these polymers. A small amount of ethylene glycol n-butyl ether may be used along with propylene glycol monomethyl ether acetate and tetrahydrofurfuryl alcohol. A small amount of ethyl 3-ethoxypropionate may be included.

The polymeric top coat of this invention is prepared by mixing the polymers together and dissolving them in an alcohol based solvent. Preferably from 40 to 80% by dry weight of a cellulose acetate butyrate ester (CAB) is mixed with 15 to 60% of an acrylic polymer and 2 to 10% of a plasticizer. Preferably 50 to 70% of CAB is used and 20 to 50% of an acrylic polymer and 2 to 10% of sucrose acetate isobutyrate as a plasticizer or extender is used.

The best results were obtained by using approximately 68% by dry film weight of cellulose acetate butyrate ester (CAB 553-0.4) and a mixture of two acrylic polymers. One of these is B-734 which is a zero acid value, 105,000 MW, methyl methacrylate and n-butyl methacrylate copolymer and the other is BR-106 which is also a copolymer of methyl methacrylate and n-butyl methacrylate, but has an acid value of 3.0 and a MW of 60,000. B-734 can be used in an amount of approximately 15% while the BR-106 is used in an amount of 10%. The sucrose acetate isobutyrate (SAIB 100) is used in amount of approximately of 5%. Approximately 0.6% of the flow improver FX8 is used in this mixture. This is a mixture of 53% ethylene glycol n-butyl ether and alkoxylated polydimethylsiloxane.

This dry mixture of polymers described above is dissolved in a mixture of polar solvents. A combination of ethyl alcohol, isopropyl alcohol, diacetone alcohol, ethylene glycol n-butyl ether, propylene glycol monomethyl ether acetate and tetrahydrofurfuryl alcohol is used. It has been found that approximately 20 to 30% of the solvent and polymers can be ethyl alcohol with approximately 10 to 12% isopropyl alcohol and 10 to 20% of diacetone alcohol and 2 to 5% of ethylene glycol n-butyl ether and 10 to 20% of propylene glycol monomethyl ether acetate and 2 to 5% of tetrahydrofurfuryl alcohol. The preferred solvent mixture is approximately 28% ethyl alcohol, 12% isopropyl alcohol, 16% diacetone alcohol, 4% ethylene glycol n-butyl ether and 16% propylene glycol monomethyl ether acetate and 4% tetrahydrofurfuryl alcohol based upon the weight of the solvent and polymers as shown in Table III infra.

Polymeric films made from the solutions demonstrated the flexibility, toughness and clarity required. Inks were applied to the films and the intercoat adhesion properties between the ink and the polymeric film was excellent.

Back coatings were applied to the ink and polymeric film structure by using a pressure sensitive adhesive film. The adhesive back coating is used in the form of a high tack, peel-and-stick film supplied as a proprietary product by Avery Dennison Graphics and Reflective Products Division. It is prepared separately by coating a high tack acrylic based emulsion adhesive on to a siliconized release paper, drying the coating and applying a second layer of release paper onto the adhesive film. This forms a laminated sandwich structure with the two release papers on each face, and the tacky adhesive film in the middle.

The back coat is applied onto the printed image graphic as a "peel-and-stick" pressure sensitive adhesive film. The resulting graphic is a composite structure having a polymeric film formed by the top coating as the top-face and the pressure sensitive adhesive back coat as the back-face. The release paper from the back-face of the adhesive film is now removed and the composite structure is adhered to the target substrate. At this stage, the top face of the temporary removable graphic still has the water release paper adhering to the top coat. It can be activated and detached from the top-face of the temporary removable graphic by applying water or soaking the water release coated paper in water, and after the release coating of the gum on the paper is dissolved, gently sliding off the paper. This completes the installation process.

The top coating with the adhesive applied can be used as a protective coating without any graphics.

This is illustrated in FIG. 2 where the pressure sensitive adhesive film is represented by the numeral 9. Silicone release layers 8 and 10 are applied to the film to permit the easy release of release paper 7 and release paper 11. Release paper 7 is provided so that it is easier to release than release paper 11 as release paper 7 is first removed and adhered to the top coating 3 as illustrated in FIG. 1. Release layer 11 is removed when the composite structure of the graphic with the adhesive is adhered to a hard surface.

Removing the Temporary Graphic from the Substrate

The composite structure was easily removed from the substrate by using the remover developed by this invention. Removers for polymeric coatings and films are readily available on the market today. The term "paint strippers" is a common definition most often used and sold commercially. Commercial paint strippers easily removed many of the polymeric films and composite structures tested but with considerable damage to the painted surface on which the composite structure was applied to. In addition, fast evaporating ketones, esters and alcohols posed less damage to the painted surfaces based upon their low flash points but were not effective removers.

In this invention, a remover was developed using a biodegradable alcohol such as tetrahydrofurfuryl alcohol and a biodegradable ester solvent such as dibasic ester. The tetrahydrofurfuryl alcohol is not an aggressive solvent and consequently does not hurt most substrates. This is also true of the dibasic ester. A small amount of three other solvents can also be included. They are ethylene glycol n-butyl ether, ethyl 3 ethoxypropionate and the 2,2,4 trimethyl-1,3-pentanediol monoisobutyrate (Table V). A combination of solvents is necessary in order to have a reasonably fast speed of removal of the coating, and not harm the substrate, especially if it is painted. The different polymers in the coating have a different solubilities in the various solvents.

The preferred remover has a formulation of:
from 50 to 80% of tetrahydrofurfuryl alcohol;
from 5 to 20% of dibasic ester;
4 to 12% of ethylene glycol n-butyl ether;
4 to 12% of the ethyl 3 ethoxypropionate; and
4 to 12% of the 2,2,4 trimethyl-13 pentanoldiol monoisobutyrate.

A surfactant such as ethoxylate of nonylphenol may be incorporated in the formulation and used to help clean the surface of the substrate when rinsed with water. A satisfactory surfactant is Surfonic® N-95. Hydroxypropyl methylcellulose may be used as a thickener for the solvents. Methocel® 311 has been found to be a satisfactory thickening agent that can increase the viscosity of the solvent composition. The preferred composition of the remover is as follows:

| | |
|---|---|
| Tetrahydrofurfuryl alcohol | 65.00% by weight |
| Dibasic ester | 10.00% by weight |
| EB solvent (ethylene glycol n-butyl ether) | 8.00% by weight |
| EEP Solvent (ethyl 3-ethoxypropionate) | 8.00% by weight |
| Texanol ester (2,2,4-trimethyl-1,3-pentanediol monoisobutyrate | 8.00% by weight |
| Surfonic N-95 | 0.50% by weight |
| Methocell 311 | 0.50% by weight |

The remover can then be applied by brushing or by roller. Dwell time for the remover to activate is between one to ten minutes. The remover along with the dissolved composite can then be wiped away with a clean cloth and at the same time the composite structure is removed without damage to the substrate.

A high surface area filler such as aluminum silicate and others can be sprinkled onto the remover during the removing step to absorb the remover and the dissolved polymeric film so that the disposable soluble waste formed can be disposed of in a landfill with no environmental damage to the area where the graphic is removed.

After a dwell time of between one to ten minutes an absorbent/adsorbent applied to the composite can be removed. Suitable absorbents include vermiculite; aluminum silicate; Fuller's Earth or similar materials to absorb/adsorb the excess remover and the dissolved temporary composite structure without damage to the substrate. Other standard absorbents/adsorbents may also be used, for example, ground cornmeal.

If the substrate is a cross-linked type painted or coated surface, the remover will not cause any damage to it. The remover solution will dissolve and remove the adhesive back coat that has been developed by Avery Dennison Graphics and Reflective Products Division along with the polymers and any inks that are included in the graphic.

An Overview of the System for Making, Applying and Removing Temporary Removable Graphics:

1. Prepare the top coat by blending the required ingredients.

2. Apply the top coating onto the gum coated face of the water release slide paper.

3. Dry the applied top coat. The coated paper may now be cut to the required standard sizes.

4. Print the desired graphics or image onto the dried top coating on the above paper.

5. Apply the adhesive back coating onto the printed area by transferring a "peel-and-stick" adhesive film from the separately available proprietary sticker.

6. Remove the protective release paper from the adhesive film face of the composite structure formed in the above step #5.

7. Stick the above composite structure onto the target area by pressing the sticky adhesive face onto the required substrate.

8. Apply water to the paper face of the above composite structure. After a few minutes of soaking, the water release paper detaches from the coating and becomes mobile.

9. Remove the water release paper from the graphic and wipe off excess water. Let it dry. The installation process is now complete.

Removal:

1. Apply the special remover of this invention by spreading a generous layer of the liquid remover onto the face of the graphics. In three to six minutes the composite structure becomes soft and loose. The speed up the process, gently scrub the surface in a circular motion, using a plastic bristle brush.

2. Sprinkle a ¼ inch layer of the powdered inorganic adsorbents described in this invention. The powder absorbs and adsorbs the viscous solution of the dissolved polymers and inks from the composite structure. Using a plastic spatula, gently move the mass of the powder over the entire surface of the graphic area, to absorb any small remains of liquid until all of it becomes a dry flowering powder.

3. The dry powder may be sucked up with a vacuum cleaner or may be brushed up for collection. It may now be disposed as a dry solid waste and not harm the environment.

4. Clean up the exposed substrate area by using tap water. A spray or sponge may be used. Wipe off excess water and let the surface dry.

5. Another temporary removable graphic may now be installed on this clean surface by repeating the above steps. The application of a graphic and its removal can be repeated many times.

The performance of all these components of the proposed system are interdependent on the behavior of the ingredients, and their balanced behavior is critical to the end results of this invention. The properties of the composite graphic should have enough resistance to withstand the wear and tear of the intended use, and when desired, it should be easily removable by being dissolved in the special remover, without damaging the substrate.

As a representative of the several coatings and solvents used for these coatings and removers with the characteristics described above, the following experiments are included:

TABLE I

Formula # Solvent Calculation
Product: Reducers M1, M2 (Medium to Slow Evaporation Rate)

| Ser. # | Name of Ingredient. | Final Formulation wt % version M1 | Final Formulation wt % version M2 |
|---|---|---|---|
| 1 | Alcohol - denatured; technical grade | 35.00 | 35.00 |
| 2 | Isopropyl Alcohol | 15.00 | 15.00 |
| 3 | Diacetone Alcohol | 15.00 | 20.00 |
| 4 | EB Solvent (Ethylene glycol n-butyl ether) | 10.00 | 5.00 |
| 5 | PM acetate (propylene glycol monomethyl ether acetate) | 10.00 | 20.00 |
| 6 | tetrahydrofurfuryl alcohol | 0.00 | 5.00 |
| 7 | EEP Solvent (ethyl 3-ethoxypropionate) | 15.00 | 0.00 |
| | Total Input >>>>>>> | 100.00 | 100.00 |
| | Calculated evaporation rate (relative to n-butyl acetate = 1) ---> | 0.919 | 0.949 |

>>> The mixture of solvents forms a clear solution. Density is 0.849 g/ml in both cases.

TABLE II

Formula #M15
Product: Top Coating

| Ser. # | Name of Ingredient. | Final Formulation Wt. (grams) ---*--------- | Wt. (%) ingredient | Wt. (%) dry solids | Wt. (%) in dry film |
|---|---|---|---|---|---|
| 1 | CAB 553-0.4 = Cellulose Acetate Butyrate - Eastman | 11.9600 | 11.96% | 11.96% | 59.49% |
| 2 | acrylic B734 = DSM-NeoResins. | 3.9900 | 3.99% | 3.99% | 19.85% |
| 3 | acrylic BR106 = Dianal America Inc. | 2.6600 | 2.66% | 2.66% | 13.23% |
| 4 | SAIB 100 = Sucrose Acetate Isobutyrate - Eastman | 1.3300 | 1.33% | 1.33% | 6.62% |
| 5 | flow improver: FX8 = Eagle Specialty Chemicals. | 0.3300 | 0.33% | 0.17% | 0.82% |
| | Reducer M1 = 79.73% wt. | | | | |
| 1 | Alcohol - denatured; technical grade | 27.9055 | 27.91% | | |
| 2 | Isopropyl Alcohol | 11.9595 | 11.96% | | |
| 3 | Diacetone Alcohol | 11.9595 | 11.96% | | |
| 4 | EB Solvent (Ethylene glycol n-butyl ether) | 7.9730 | 7.97% | | |
| 5 | PM acetate (propylene glycol monomethyl ether acetate) | 7.9730 | 7.97% | | |
| 6 | tetrahydrofurfuryl alcohol | 0.0000 | 0.00% | | |
| 7 | EEP Solvent (ethyl 3-ethoxypropionate) | 11.9595 | 11.96% | | |
| | Total Input >>>>>>> = | 100.00 | 100.00% | 20.11% | 100.00% |

>>>>>>> This makes a clear film. Viscosity at this concentration = 80 cp at 25 deg. C. Also, gives good leveling and initial gloss, but shows blushing effects. Coated a film to test on car. Shows very mild attack by Cleaner 409 and also by Windex ® solution. Has a slightly lower adhesion.

TABLE III

Formula #M15A
Product: Top Coating

| Ser. # | Name of Ingredient. | Final Formulation Wt. (grams) ---*--------- | Wt. (%) ingredient | Wt. (%) dry solids | Wt. (%) in dry film |
|---|---|---|---|---|---|
| 1 | CAB 553-0.4 = Cellulose Acetate Butyrate - Eastman | 16.4100 | 16.41% | 16.41% | 68.12% |
| 2 | acrylic B734 = DSM-NeoResins. | 3.7900 | 3.79% | 3.79% | 15.73% |
| 3 | acrylic BR106 = Dianal America Inc. | 2.5300 | 2.53% | 2.53% | 10.50% |
| 4 | SAIB 100 = Sucrose Acetate Isobutyrate - Eastman | 1.2000 | 1.20% | 1.20% | 4.98% |
| 5 | flow improver: FX8 = Eagle Specialty Chemicals | 0.3200 | 0.32% | 0.16% | 0.66% |
|  | Reducer M2 = 75.75% wt. |  |  |  |  |
| 1 | Alcohol - denatured; technical grade | 26.5125 | 26.51% |  |  |
| 2 | Isopropyl Alcohol | 11.3625 | 11.36% |  |  |
| 3 | Diacetone Alcohol | 15.1500 | 15.15% |  |  |
| 4 | EB Solvent (Ethylene glycol n-butyl ether) | 3.7875 | 3.79% |  |  |
| 5 | PM acetate (propylene glycol monomethyl ether acetate) | 15.1500 | 15.15% |  |  |
| 6 | tetrahydrofurfuryl alcohol | 3.7875 | 3.79% |  |  |
| 7 | EEP Solvent (ethyl 3-ethoxypropionate) | 0.0000 | 0.00% |  |  |
|  | Total Input >>>>>>> = | 100.00 | 100.00% | 24.09% | 100.00% |

>>>>>>> This makes a clear film. Viscosity at this concentration = 150 cps at 25 deg. C. Also, gives good leveling and gloss. Was tested on car. Shows no attack by Cleaner 409 or Windex ® solution or car washes. Has good hardness & adhesion.

TABLE IV

Formula #DX-2-a-2
Product: Top Coating

| Ser. # | Name of Ingredient. | Final Formulation Wt. (grams) ---*--------- | Wt. (%) ingredient | Wt. (%) dry solids | Wt. (%) in dry film |
|---|---|---|---|---|---|
| 1 | CAB 531.1 | 8.00 | 8.51% | 8.51% | 40.00% |
| 2 | acrylic B723 = DSM-NeoResins. | 12.00 | 12.77% | 12.77% | 60.00% |
| 4 | Alcohol, denatured, 95% | 54.00 | 57.45% |  |  |
| 5 | Dibasic Ester | 0.00 | 0.00% |  |  |
| 6 | Diacetone Alcohol | 20.00 | 21.28% |  |  |
|  | Total Input >>>>>>> = | 94.00 | 100.00% | 21.28% | 100.00% |

>>>>>>> This makes a clear film, but has some insoluble particles, apparently from the CAB. Viscosity was about 4500 cps at 25 C.

TABLE V

Formula #DX-2-c-2
Product: Top Coating

| Ser. # | Name of Ingredient. | Final Formulation Wt. (grams) ---*--------- | Wt. (%) ingredient | Wt. (%) dry solids | Wt. (%) in dry film |
|---|---|---|---|---|---|
| 1 | CAB 531.1 | 8.00 | 8.51% | 8.51% | 40.00% |
| 2 | acrylic B734 = DSM-NeoResins. | 12.00 | 12.77% | 12.77% | 60.00% |
| 4 | Alcohol, denatured, 95% | 54.00 | 57.45% |  |  |
| 5 | Dibasic Ester | 0.00 | 0.00% |  |  |
| 6 | Diacetone Alcohol | 20.00 | 21.28% |  |  |
|  | Total Input >>>>>>> = | 94.00 | 100.00% | 21.28% | 100.00% |

>>>>>>> This makes a clear film, but has some insoluble particles, apparently from the CAB.

TABLE VI

Formula #DX-2-a-1
Product: Top Coating

| Ser. # | Name of Ingredient. | Final Formulation Wt. (grams) ---*--------- | Wt. (%) ingredient | Wt. (%) dry solids | Wt. (%) in dry film |
|---|---|---|---|---|---|
| 1 | CAB 553-0.4 = Cellulose Acetate Butyrate - Eastman | 18.10 | 13.86% | 13.86% | 63.84% |
| 2 | acrylic B723 = DSM-NeoResins. | 10.25 | 7.85% | 7.85% | 36.16% |
| 3 | Alcohol, denatured, 95% | 67.19 | 51.45% | | |
| 4 | Isopropyl Alcohol | 14.00 | 10.72% | | |
| 5 | Diacetone Alcohol | 21.06 | 16.13% | | |
| | Total Input >>>>>>> = | 130.60 | 100.00% | 21.71% | 100.00% |

>>>>>>> This makes a clear film, but is very viscous (+5500 cps) at these concentrations. Also, develops a slight haze upon standing for 2 weeks.

TABLE VII

Formula #DX-2-a-1-a.
Product: Top Coating

| Ser. # | Name of Ingredient. | Final Formulation Wt. (grams) ---*--------- | Wt. (%) ingredient | Wt. (%) dry solids | Wt. (%) in dry film |
|---|---|---|---|---|---|
| 1 | CAB 553-0.4 = Cellulose Acetate Butyrate - Eastman | 18.85 | 14.08% | 14.08% | 59.65% |
| 2 | acrylic B723 = DSM-NeoResins. | 10.25 | 7.66% | 7.66% | 32.44% |
| 3 | SAIB 100 = Sucrose Acetate Isobutyrate - Eastman | 2.50 | 1.87% | 1.87% | 7.91% |
| 4 | Alcohol, denatured, 95% | 67.19 | 50.20% | | |
| 5 | Isopropyl Alcohol | 14.00 | 10.46% | | |
| 6 | Diacetone Alcohol | 21.06 | 15.73% | | |
| | Total Input >>>>>>> = | 133.85 | 100.00% | 23.61% | 100.00% |

>>>>>>> This makes a clear film. Viscosity was 450 cps at 25 C. Also, develops a 5% increase in viscosity upon standing for 2 weeks.

TABLE VIII

Formula #R-3
Product: Remover

| Ser. # | Name of Ingredient. | Final Formulation Wt. (grams) ---*--------- | Wt. (%) ingredient |
|---|---|---|---|
| 1 | tetrahydrofurfuryl alcohol | 65.00 | 65.00% |
| 2 | Dibasic Ester | 10.00 | 10.00% |
| 3 | EB Solvent (Ethylene glycol n-butyl ether) | 8.00 | 8.00% |
| 4 | EEP Solvent (ethyl 3-ethoxypropionate) | 8.00 | 8.00% |
| 5 | texanol ester (2,2,4-trimethyl-1,3-pentanediol monoisobutyrate) | 8.00 | 8.00% |
| 6 | Surfonic n-95 | 0.50 | 0.50% |
| 7 | methocell 311 | 0.50 | 0.50% |
| | Total Input >>>>>>> = | 100.00 | 100.00% |

>>>>>>> This makes a colorless hazy viscous liquid. Viscosity was 400 cps at 25 C. Density is 1.05 to 1.10 at 25 C.

A General Note on Mixing Procedure and Method

All blending vessels were made of stainless steel and were grounded using a flexible clamp wired to a copper grounding strap to prevent any sparking due to static charge build up. The stirring system had a disperser type blade and a variable speed explosion proof motor fitted to it. All electrical fittings in the mixing area were suitable for Class I, Division I flammable materials handling environment. The vessels were enclosed and covered to prevent any major losses of volatile materials.

Example 1

Preparing a Mixture of the Solvents in Accordance with Table I

The two formulations for the solvent mixtures used in preparing the coatings have slightly different proportions of the components, as these were required to achieve the optimum solubilities for the different resins used to prepare the various coatings.

These blends produce two mixtures that may also be used as diluent reducers for thinning down the final coating to make it suitable for spraying applications. The theoretical evaporation rate for Reducer M1 is lower than Reducer M2, which makes M2 a slightly faster evaporating blend. It is necessary in colder conditions to have a slightly faster evaporation rate, whereas in warmer conditions a slower evaporating mixture is preferred. The term "retarder" is used for a blend of thinning solvents that has a slower evaporation rate compared to the blend that has a medium rate of evaporation. Hence, M1 may be considered a retarder, and M2 may be considered a reducer for this coating system.

M1: A 100 liter batch of the retarder M1 was prepared. Thirty-five liters of denatured ethyl alcohol (35%) was added, followed by 15 liters of isopropyl alcohol (15%) and 15 liters of diacetone alcohol (15%). Ten liters of EB Solvent (Ethylene glycol n-butyl ether) (10%) was added, followed by ten liters of PM acetate (propylene glycol monomethyl ether acetate) (10%) and 15 liters of EEP Solvent (ethyl 3-ethoxypropionate) (15%). The mixture was gently stirred for 15 minutes to complete this procedure.

M2: A 100 liter batch of the retarder M1 was prepared. Thirty-five liters of denatured ethyl alcohol (35%) was added, followed by 15 liters of isopropyl alcohol (15%) and 20 liters of diacetone alcohol (20%). Five liters of EB Solvent (Ethylene glycol n-butyl ether) (5%) was added, followed by 20 liters of PM acetate (propylene glycol monomethyl ether acetate) (20%) and five liters of tetrahydrofurfuryl alcohol (5%). The mixture was gently stirred for 15 minutes to complete this procedure.

Example 2

Preparing the Top Coating #M15 in Accordance with Table II 100 lb. of the coating was prepared. Seventy-nine and 73/100 lb. of solvents mixture M1 (79.73%) was added to the mixing vessel. While mixing slowly, 11 and 96/100 lb. (11.96%) of CAB 553-0.4 Cellulose Acetate Butyrate powder from Eastman Chemical was gradually added into the liquid. The liquid was mixed for 30 minutes to ensure no big lumps of the agglomerated polymer remain in the liquid. Three and 99/100 lb. (3.99%) of acrylic B734 from DSM-NeoResins were gradually added to the liquid while mixing. Two and 66/100 lb. (2.66%) of acrylic BR106 from Dianal America were gradually added to the liquid while mixing. One and 33/100 lb. (1.33%) of SAIB 100 Sucrose Acetate Isobutyrate from Eastman Chemicals were gradually added to the liquid while mixing. 33/100 lb. (0.33%) of flow improver FX8 from Eagle Specialty Chemicals was gradually added to the liquid while mixing. Mixing was continued for about 45 minutes to ensure no undissolved particles remained in the solution. Minor adjustments may be made at this stage by adding up to 2% of the required components to bring the batch within the specifications.

Quality Control: Samples were drawn to check the viscosity using a brookfield viscometer. A sample was dried for four hours in an oven at 110° C. to check for the percent solid content. A film was cast on a glass sheet to check for the film clarity and color. During the development stage, hardness, abrasion, elongation and tensile properties of the film were also tested.

Example 3

Preparing the Top Coating #M15A in Accordance with Table III 100 lb. of the coating was prepared. Seventy-five and 75/100 lb. of solvents mixture M2 (75.75%) was added to the mixing vessel. While mixing slowly, 16 and 41/100 lb. (16.41%) of CAB 553-0.4 Cellulose Acetate Butyrate powder from Eastman Chemical was gradually added into the liquid. The liquid was mixed for 30 minutes to ensure no big lumps of the agglomerated polymer remain in the liquid. Three and 79/100 lb. (3.79%) of acrylic B734 from DSM-NeoResins were gradually added to the liquid while mixing. Two and 53/100 lb. (2.53%) of acrylic BR106 from Dianal America were gradually added to the liquid while mixing. One and 20/100 lb. (1.20%) of SAIB 100 Sucrose Acetate Isobutyrate from Eastman Chemicals were gradually added to the liquid while mixing. 32/100 lb. (0.32%) of flow improver FX8 from Eagle Specialty Chemicals was gradually added to the liquid while mixing. Mixing was continued for about 45 minutes to ensure no undissolved particles remained in the solution. Minor adjustments may be made at this stage by adding up to 2% of the required components to bring the batch within the specifications.

Quality Control: The same procedures were used for quality control as shown in Example 2.

Example 4

Preparing the Top Coating #DX-2-a-2 in Accordance with Table IV 100 lb. of the coating was prepared. Fifty-seven and 45/100 lb. (57.45%) of ethyl alcohol and 21 and 28/100 lb. (21.28%) of diacetone alcohol was added to the mixing vessel. While mixing slowly, eight and 51/100 lb. (8.51%) of CAB 531.1 Cellulose Acetate Butyrate powder from Eastman Chemical was gradually added into the liquid. The liquid was mixed for 30 minutes to ensure no big lumps of the agglomerated polymer remain in the liquid. Twelve and 77/100 lb. (12.77%) of acrylic B723 from DSM-NeoResins were gradually added to the liquid while mixing.

Mixing was continued for about 45 minutes to ensure no undissolved particles remained in the solution. Minor adjustments may be made at this stage by adding up to 2% of the required components to bring the batch within the specifications.

Quality Control: The same procedures were used for quality control as shown in Example 2.

Example 5

Preparing the Top Coating #DX-2-c-2 in Accordance with Table V 100 lb. of the coating was prepared. Fifty-seven and 45/100 lb. (57.45%) of ethyl alcohol and 21 and 28/100 lb. (21.28%) of diacetone alcohol was added to the mixing vessel. While mixing slowly, eight and 51/100 lb. (8.51%) of CAB 531.1 Cellulose Acetate Butyrate powder from Eastman Chemical was gradually added into the liquid. The liquid was mixed for 30 minutes to ensure no big lumps of the agglomerated polymer remain in the liquid. Twelve and 77/100 lb. (12.77%) of acrylic B734 from DSM-NeoResins were gradually added to the liquid while mixing.

Mixing was continued for about 45 minutes to ensure no undissolved particles remained in the solution. Minor adjustments may be made at this stage by adding up to 2% of the required components to bring the batch within the specifications.

Quality Control: The same procedures were used for quality control as shown in Example 2.

Example 6

Preparing the Top Coating #DX-2-a-1 in Accordance with Table VI 100 lb. of the coating was prepared. Fifty-one and 45/100 lb. (51.45%) of ethyl alcohol, and 16 and 13/100 lb. (16.13%) of diacetone alcohol and ten and 72/100 lb. (10.72%) of isopropyl alcohol was added to the mixing vessel. While mixing slowly, 13 and 86/100 lb. (13.86%) of CAB 553-0.4 Cellulose Acetate Butyrate powder from Eastman Chemical was gradually added into the liquid. The liquid was mixed for 30 minutes to ensure no big lumps of the agglomerated polymer remain in the liquid. Seven and 85/100 lb. (7.85%) of acrylic B723 from DSM-NeoResins were gradually added to the liquid while mixing.

Mixing was continued for about 45 minutes to ensure no undissolved particles remained in the solution. Minor adjustments may be made at this stage by adding up to 2% of the required components to bring the batch within the specifications.

Quality Control: The same procedures were used for quality control as shown in Example 2.

Example 7

Preparing the Top Coating #DX-2-a-1-a in Accordance with Table VII 100 lb. of the coating was prepared. Fifty and 20/100 lb. (50.20%) of ethyl alcohol, and 15 and 73/100 lb. (15.73%) of diacetone alcohol and ten and 46/100 lb. (10.46%) of isopropyl alcohol was added to the mixing vessel. While mixing slowly, 14 and 08/100 lb. (14.08%) of CAB 553-0.4 Cellulose Acetate Butyrate powder from Eastman Chemical was gradually added into the liquid. The liquid was mixed for 30 minutes to ensure no big lumps of the agglomerated polymer remain in the liquid. Seven and 66/100 lb. (7.66%) of acrylic B723 from DSM-NeoResins were gradually added to the liquid while mixing. One and 87/100 lb. (1.87%) of SAIB 100 Sucrose Acetate Isobutyrate from Eastman Chemicals were gradually added to the liquid while mixing. Mixing was continued for about 45 minutes to ensure no undissolved particles remained in the solution. Minor adjustments may be made at this stage by adding up to 2% of the required components to bring the batch within the specifications.

Quality Control: The same procedures were used for quality control as shown in Example 2.

Example 8

Preparing the Graphic Remover #R-3 in Accordance with Table VIII 100 lb. of the remover was prepared. Sixty-five lb. (65.00%) of tetrahydrofurfuryl alcohol, and ten lb. (10.00%) of dibasic ester and eight lb. (8.00%) of EB Solvent (Ethylene glycol n-butyl ether) and eight lb. (8.00%) of EEP Solvent (ethyl 3-ethoxypropionate) and eight lb. (8.00%) of texanol ester (2,2,4-trimethyl-1,3-pentanediol monoisobutyrate) were added to the mixing vessel. While mixing slowly, 05/100 lb. (0.50%) of Surfonic n-95 and 05/100 lb. (0.50%) of methocell 311 was gradually added into the liquid. The liquid was mixed for 30 minutes to ensure no big lumps of the agglomerated polymer remain in the liquid. Mixing was continued for about 45 minutes to ensure no undissolved particles remained in the solution. Minor adjustments may be made at this stage by adding up to 2% of the required components to bring the batch within the specifications.

Quality Control: Ten mil wet films of the top coating are cast, dried and an adhesive layer is stuck on the back. The remover is then used to check for efficiently dissolving all parts of the coating and the adhesive.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the present patent specification as a whole.

What is claimed is:

1. A composition for use as a removable top coat comprising by percentage dry weight, based on the total dry weight of components a), b) and c) combined:
   a) 40 to 80% of cellulose acetate butyrate ester, wherein the cellulose acetate butyrate ester is selected from (i) cellulose acetate butyrate having, on the average, butyryl content of 46 wt %, acetyl content of 2 wt %, hydroxyl content of 4.8 wt %, glass transition temperature 136° C., melting point 150-160° C., and molecular weight 20,000, and (ii) cellulose acetate butyrate having, on the average, butyryl content of 50 wt %, acetyl content of 3 wt %, hydroxyl content of 1.7 wt %, melting point 135-150° C., glass transition temperature 115° C., and molecular weight 40,000;
   b) 15 to 60% of at least one acrylic polymer, wherein the at least one acrylic polymer is selected from (i) methyl methacrylate copolymer having, on the average, molecular weight 105,000, glass transition temperature 45° C. and acid value of zero, (ii) copolymer of n-butyl methacrylate and methyl methacrylate having, on the average, molecular weight of approximately 60,000, glass transition temperature of 58° C. and acid value of 3, and (iii) copolymer of n-butyl methacrylate and methyl methacrylate, molecular weight of about 200,000, glass transition temperature of 48° C., and acid value 5.5; and
   c) 2 to 10% of a plasticizer, wherein the plasticizer is sucrose acetate isobutyrate;
   in an amount of solvent effective to dissolve the dry components of the composition, wherein the solvent comprises at least one organic solvent.

2. The composition of claim 1 further comprising a pigmented compound.

3. The composition of claim 1, wherein the cellulose acetate butyrate ester is cellulose acetate butyrate having, on the average, butyryl content of 46 wt %, acetyl content of 2 wt %, hydroxyl content of 4.8 wt %, glass transition temperature 136° C., melting point 150-160° C., and molecular weight 20,000.

4. The composition of claim 1, wherein the cellulose acetate butyrate ester is cellulose acetate butyrate having, on the average, butyryl content of 50 wt %, acetyl content of 3 wt %, hydroxyl content of 1.7 wt %, melting point 135-150° C., glass transition temperature 115° C., and molecular weight 40,000.

5. The composition of claim 1, wherein the at least one acrylic polymer is selected from (i) methyl methacrylate copolymer having, on the average, molecular weight 105,000, glass transition temperature 45° C. and acid value of zero, and (ii) copolymer of n-butyl methacrylate and methyl methacrylate having, on the average, molecular weight of approximately 60,000, glass transition temperature of 58° C. and acid value of 3.

6. The composition of claim 1 further comprising a flow improver.

7. The composition of claim 6, wherein the weight of the flow improver is 0.16 to 1% by weight of the composition after evaporation of the solvent.

8. The composition of claim 6, wherein the flow improver contains alkoxylated polydimethylsiloxane and ethyleneglycol n-butyl ether.

9. The composition of claim 1, wherein the solvent comprises at least one lower molecular weight alcohol.

10. The composition of claim 1, wherein the cellulose acetate butyrate ester is used in an amount of approximately 68% by dry weight of the composition and the acrylic polymer is a mixture of: (i) methyl methacrylate copolymer having, on the average, molecular weight 105,000, glass transition temperature 45° C. and acid value of zero in an amount of approximately 15% by dry weight of the composition and (ii) copolymer of n-butyl methacrylate and methyl methacrylate having, on the average, molecular weight of approximately 60,000, glass transition temperature of 58° C. and acid value of 3 in an amount of approximately 10% by dry weight of the composition.

11. The composition of claim 5, wherein the at least one acrylic polymer is methyl methacrylate copolymer having, on the average, molecular weight 105,000, glass transition temperature 45° C. and acid value of zero.

12. The composition of claim 1, wherein the at least one acrylic polymer is copolymer of n-butyl methacylate and methyl methacrylate, molecular weight of about 200,000, glass transition temperature of 48° C., and acid value 5.5.

13. The composition of claim 5, wherein the at least one acrylic polymer is copolymer of n-butyl methacrylate and methyl methacrylate having, on the average, molecular weight of approximately 60,000, glass transition temperature of 58° C. and acid value of 3.

14. The composition of claim 1 further comprising at least one additive.

15. The composition of claim 14, wherein the at least one additive is selected from UV absorbers, optical brightening agents, UV tracers, heat stabilizers, plasticizers, phosphorescence agents and anti-oxidants.

16. The composition of claim 9, wherein the at least one lower molecular weight alcohol is selected from ethyl alcohol, isopropyl alcohol, and diacetone alcohol.

17. The composition of claim 1, wherein the at least one organic solvent is selected from ethylene glycol n-butyl ether, ethyl 3-ethoxypropionate, propylene glycol monomethyl ether acetate and tetrahydrofurfuryl alcohol.

18. The composition of claim 1, wherein the at least one acrylic polymer is a mixture of (i) methyl methacrylate copolymer having, on the average, molecular weight 105,000, glass transition temperature 45° C. and acid value of zero, and (ii) copolymer of n-butyl methacrylate and methyl methacrylate having, on the average, molecular weight of approximately 60,000, glass transition temperature of 58° C. and acid value of 3.

* * * * *